UNITED STATES PATENT OFFICE.

MARK C. RICH, OF HOT SPRINGS, SOUTH DAKOTA.

ALFALFA PRODUCT.

1,108,238. Specification of Letters Patent. Patented Aug. 25, 1914.

No Drawing. Application filed November 28, 1911, Serial No. 662,919. Renewed June 22, 1914. Serial No. 846,628.

*To all whom it may concern:*

Be it known that I, MARK C. RICH, a resident of Hot Springs, in the county of Fall River and State of South Dakota, have invented certain new and useful Improvements in Alfalfa Products, of which the following is a full, clear, and exact description.

The invention relates to the manufacture of food products from alfalfa. This material has long been recognized as a good food for cattle or stock because of its tissue-building properties, but has not been used for human food because it was not palatable as usually treated or prepared for stock or cattle.

In the preparation of alfalfa as a food for cattle or stock, it is usually left to grow until it is, and is cut when, about 30 to 35 days old and is about half in bloom. At this stage of its growth, the alfalfa is about 20 to 24 inches high, and is woody, fibrous, somewhat hard and is of such character that it has not been considered desirable for human food.

By experiments, I have discovered that if alfalfa is harvested and treated as hereinafter set forth, it may be utilized in the preparation of foods for human consumption, and may be rendered both palatable and digestible.

According to the present improvement, the alfalfa is cut, when it is from 8 to 12 inches high and approximately 14 days old, and before it has become woody, fibrous, and hard, as compared with its condition when it is about 30 to 35 days old and approximately from 20 to 24 inches high. By cutting the alfalfa at the earlier stage pointed out, the products made therefrom will lack the properties which have made it desirable for human consumption. The alfalfa is cut about 4 inches above the ground leaving about 4 inches stubble. As it is cut by a mower, it is caught in baskets and deposited in small bunches of about a bushel each, and laid on the stubble where it is permitted to remain for about 24 hours and during that period, the air will circulate through the bunches, and the leaves of the alfalfa will wilt and the stems will be partially dried so that about one half of the inherent moisture in the alfalfa will be removed. This treatment of alfalfa which has been cut at the stage pointed out, sweetens the odor of and partially cures the alfalfa. Next, the alfalfa is gathered and stored very loosely in layers or on racks and subjected to artificial heat of approximately 150 degrees Fahrenheit, from 3 to 7 days. This treatment prevents bleaching and causes the alfalfa to retain its desirable flavor or aroma and remain light green in color. The period in which the alfalfa is subjected to artificial heat is varied according to the amount of moisture in the alfalfa and the weather.

The alfalfa after it has been dried, is then ground. This product may then be used in the preparation of different foods or beverages for human consumption. Next, two parts of this ground green alfalfa is mixed together with one part of ground whole-wheat and enough molasses to cohere together. The latter renders the ground whole-wheat and alfalfa coherent, and after being mixed together, is roasted in an oven for about 30 minutes to one hour, until it has become dark brown. In this roasting, the material is formed into a cake, which is next broken up or granulated. This granulated material may be boiled with water to produce a palatable beverage for human consumption, which has a flavor somewhat similar to coffee and in which the food-values of the alfalfa are retained.

The invention is not to be understood as restricted to the precise process and proportions mentioned, since these may be modified within the scope of the appended claims, without departing from the scope and spirit of the invention.

Having thus described the invention, what I claim as new and desire to secure by Letters Patent, is:

1. That improvement which consists in grinding alfalfa which is free from woody fiber and mixing it with ground wheat.

2. That improvement which consists in cutting alfalfa before it has become woody and fibrous, then drying it, grinding it, mixing it with ground wheat and a saccharine material, and then roasting the mixture until it is brown.

3. That improvement which consists in cutting alfalfa before it has become woody and fibrous, partially curing it in the field then subjecting it to artificial heat to prevent bleaching, then grinding it, and mixing it with ground wheat.

4. That improvement which consists in cutting alfalfa before it has become woody and fibrous, partially curing it in the field, then grinding it, then drying it by artificial heat to prevent bleaching, then mixing it with ground wheat and a saccharine material, and then roasting the mixture.

5. An alfalfa product containing alfalfa which is free from woody fiber and ground wheat.

6. A dry ground alfalfa product containing alfalfa and ground wheat roasted together.

7. A dry ground alfalfa product containing alfalfa, ground wheat and a saccharine material roasted together.

Signed at Chicago, Illinois, this 28th day of October, A. D. 1911.

MARK C. RICH.

Witnesses:
 FRED GERLACH,
 F. W. BOWER.